United States Patent
Sato et al.

(10) Patent No.: US 6,396,021 B1
(45) Date of Patent: May 28, 2002

(54) WIRE-DISCHARGE MACHINING APPARATUS

(75) Inventors: Tatsushi Sato; Seiji Satou; Yoshikazu Ukai, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/613,751

(22) Filed: Jul. 11, 2000

(30) Foreign Application Priority Data

Oct. 18, 1999 (JP) ............................................ 11-295218

(51) Int. Cl.⁷ ............................ B23H 1/00; B23H 7/04; B23H 7/20
(52) U.S. Cl. .................................. 219/69.12; 219/69.13
(58) Field of Search ........................... 219/69.12, 69.13; 700/162

(56) References Cited

U.S. PATENT DOCUMENTS

| | | | | |
|---|---|---|---|---|
| 3,912,898 A | * | 10/1975 | Pfau et al. ................ | 219/69.17 |
| 5,756,956 A | * | 5/1998 | Sato et al. ................ | 219/69.12 |
| 6,278,075 B1 | * | 8/2001 | Kamiguchi .............. | 219/69.12 |

FOREIGN PATENT DOCUMENTS

| | | | | |
|---|---|---|---|---|
| JP | 64-27813 | 1/1989 | | |
| JP | 64-27814 | 1/1989 | | |
| JP | 3-79223 | * 4/1991 | .............. | 219/69.13 |
| JP | 4-30915 | 2/1992 | | |
| JP | 6-320337 | * 11/1994 | .............. | 219/69.12 |

OTHER PUBLICATIONS

Dictionary of Science and Engineering English–Japanese, Japanese–English, 3$^{rd}$ edition, Dec. 1990, Published by Inter Press, p. 369.*

* cited by examiner

*Primary Examiner*—Geoffrey S. Evans
(74) *Attorney, Agent, or Firm*—Leydig, Voit & Mayer, Ltd.

(57) ABSTRACT

A wire-discharge machining apparatus for machining a workpiece by generating discharges between a wire electrode and the workpiece. In machining, the apparatus can detect all portions where wire-breakage frequently occurs and strictly discriminate between a condition detected and a control result, achieving wire-breakage prevention. This wire-discharge machining apparatus has an evaluating device and a controller. The evaluating device measure cycles, frequencies, or ignition delay times of the discharges as a measured value, evaluates the dispersion of the measured values, and outputs an evaluation value. The controller controls machining conditions according to the evaluation value.

15 Claims, 10 Drawing Sheets

WIRE-DISCHARGE MACHINING APPARATUS

BACKGROUND OF THE INVENTION

1. Field of the Invention

The present invention relates to a wire-discharge machining apparatus. In particular, the invention relates to a wire-discharge machining apparatus which performs necessary and sufficient wire-breakage prevention operations, thereby allowing machining performance to be significantly improved.

2. Description of the Related Art

In wire-discharge machining, machining speeds are improved proportionally to an increase in machining energy. However, application of the machining energy in excess of a limit causes breakage of a wire electrode, thereby seriously reducing the machining speeds. Therefore, it has been a common practice to proceed with the machining while preventing wire breakage by limiting the energy input to the machining apparatus to below a predetermined limit.

Nevertheless, the level of the energy which causes wire breakage varies according to conditions. For instance, energy below a standard energy level tends to cause wire breakage at certain locations along the machining path such as an end surface or a step of a workpeice and a corner of the electrode path. A countermeasure commonly adopted to obviate this problem is to set a limit level of the machining energy significantly lower than a standard energy level throughout the machining process, particularly when the machining includes a condition which tends to cause wire breakage. This causes a problem in that, for example, the low limit set for the machining energy is applied not only during machining of portions where wire breakage tends to occur but also during machining of portions that are to be machined with energy of a normal level, with the result that the machining speed is unnecessarily reduced. Furthermore, indefiniteness of the low limit level of the machining energy makes it difficult to completely avoid wire breakage.

To solve these problems, for example, Japanese Unexamined Patent Application Publication No. 4-30915 proposed a method in which machining energy is reduced upon detection of a corner in an electrode path which is performed based on a sharp decrease in the number of the discharge pulses followed by a gradual increase of the same. FIG. 11 is a schematic view of one example of a discharge-machining-conditions adjustment circuit used in conventional wire-discharge machining, as proposed in the above-mentioned publication. In this figure, 10a denotes a counter, 10b denotes a frequency-to-voltage converting circuit, 10c denotes a threshold-setting circuit, and 10d denotes a comparator. FIG. 12 shows variation in the number of pulses and threshold of the pulses before and after passing through a corner in an electrode path. Referring now to FIG. 12, the solid line represents thresholds set in the threshold-setting circuit 10c, and the dotted line represents an actual number of pulses (that is, an output of the frequency-to-voltage converting circuit 10b).

In operation, the counter 10a counts discharge pulses, and the count value is converted at an interval of several milliseconds into a voltage value corresponding to the current number of pulses. The voltage value corresponding to the current number of pulses is input to one side of the comparator 10d and as well as to the threshold-setting circuit 10c.

In the threshold-setting circuit 10c, when the input voltage sharply decreases, the number of pulses in 0.5 second is averaged by a short-time constant low-pass filter of, whereas, when the input voltage gradually increases, the number of pulses in 10 seconds is averaged by a long-time constant low-pass filter. In either case, a threshold is obtained through multiplication of the averaged filter output with a gain of 1.1 to 1.2, and the threshold thus obtained is output to the comparator 10d. When the current number of pulses is larger than the threshold, the comparator 10d generates a command signal for increasing the off time of the discharge pulses, thereby suppressing the increase of the number of discharge pulses. As a result, as shown in FIG. 12, the number of pulses is controlled so as not to exceed the threshold obtained by averaging the number of pulses over a short period when the number of discharge pulses sharply decreases and over a long period when the pulse number increases gradually.

In the conventional wire-discharge machining apparatus, breakage of wire electrode is prevented by the above-described method. However, wire-breakage frequently occur not only at the corners but also at various other non-linear portions of the electrode path, such as stepped portions where the work thickness abruptly varies and end-surface portions. The conventional method as described above can effectively be used only for the corners, leaving the problem unsolved for other portions where wire breakage is likely to take place.

Another big problem with the described method is that a detection parameter is the same as a control parameter. Insofar as a sharp decrease and a gradual increase of the discharge pulses are referenced to detect corners in the electrode path, the number of the discharge pulses is regarded as being a detection parameter. Meanwhile, with a long off-time set for a corner, since the number of the discharge pulses is directly controlled, the number of the discharge pulses serves also as a control parameter. In this case, it is not clearly known whether a decrease or an increase in the number of discharge pulses is to be attributed to the presence of a corner in the electrode path or to be understood as being the control results. This makes it difficult to precisely determine the start and the end of a corner, thus hampering adequate control at a corner of the electrode path.

SUMMARY OF THE INVENTION

To solve the problems as described above, an object of the present invention is to provide a wire-discharge machining apparatus that can sufficiently detect not only corners but also all other portions such as steps and end-surface portions of a work where wire-breakage occurs more frequently than at normal portions, and that can carry out necessary and sufficient wire-breakage prevention operations by using a control method that can discriminate between the parameter which is to be used for detection and the parameter which indicates the control results.

To achieve the above object, according to the present invention, there is provided a wire-discharge machining apparatus for machining a work by generating pulse-state discharges between a wire electrode and the work, comprising: evaluating means for measuring one of the cycle time, the frequency, and the ignition delay time of the discharges, for evaluating dispersion of the measured values, and for outputting an evaluation value for the dispersion; and control means for controlling machining conditions based on the evaluation value for the dispersion.

The arrangement may be such that the evaluating means evaluates at least one of the sample variance of the measured values, unbiased variance of the measured values, the standard deviation of the measured values, the variation coefficient of the measured values, the squared mean of the measured values, the distortion of the measured values, the kurtosis of the measured values, the mean deviation of the measured values, and the absolute values of the differences between the measured values and the mean value.

The evaluating means may comprise: means for determining the square of the mean of the measured values; means for determining the mean of the squares of the measured values; and means for determining the difference between the square of the mean of the measured values and the mean of the squares of the measured values.

The evaluating means may comprises: a function generator for producing outputs variable over two or more kinds in accordance with occurrence of a discharge; an integrator for integrating the outputs of the function generator; and means for outputting either the absolute value of the difference between the output of the integrator and the product of the integration period and the expected value of the output of the function generator, or an index which is in a monotonic relation to the absolute value.

The arrangement also may be such that the evaluating means comprises: a function generator for producing outputs variable over two or more kinds in accordance with occurrence of a discharge; an integrator for integrating the differences between the outputs of the function generator and the expected values of the outputs of the function generator; and means for outputting either the absolute value of the output of the integrator or an index which is in a monotonic relation to the absolute value.

The arrangement also my be such that the evaluating means comprises: a function generator for producing outputs variable over two or more kinds in accordance with occurrence of a discharge; an integrator for integrating the outputs of the function generator; means for dividing the period of integration into two regions of an equal length; and means for outputting the absolute value of the output of the integrator or an index having a monotonic relation to the absolute value; wherein the integrator performs the integration in opposite directions in the two regions of integration.

The arrangement also may be such that the evaluating means comprises: a function generator for producing outputs which are variable over two or more kinds in accordance with occurrence of a discharge and the expected values of which are zero; an integrator for integrating the outputs of the function generator; and means for outputting the absolute value of the output of the integrator or an index having a monotonic relation to the absolute value.

The function generator may comprise a frequency divider for producing an output inverted each time the discharge occurs.

The integrator may be a counter.

The wire-discharge machining apparatus may further comprise: a timer for measuring time intervals whereat the discharges occur; a first first-in first-out (FIFO) matrix for storing resultant values of measurement by the timer; a first register for storing the sum of the resultant values stored in the first FIFO matrix; a first adder for adding the resultant values of measurement by the timer to the value stored in the first register; a first subtracter for subtracting values of outputs of the first FIFO matrix from the value stored in the first register; a first squaring calculator for squaring contents of the first register; a second squaring calculator for squaring the resultant values of measurement by the timer; a second FIFO matrix for storing values of outputs of the second squaring calculator; a second register for storing the sum of the values stored in the second FIFO matrix; a second adder for adding values of outputs of the second squaring calculator to the value stored in the second register; a second subtracter for subtracting values of outputs of the second FIFO matrix from the value memorized in the second register; and a third subtracter for subtracting values of outputs of the second squaring calculator from contents of the second register; wherein the evaluating means uses an output of the third subtracter as the evaluation value for the dispersion.

The arrangement also may be such that the wire-discharge machining apparatus further comprises: a clock for generating clock pulses to be used as references for time measurement; a timer for outputting evaluation pulses at constant time intervals; a frequency divider for producing an output logically-inverted each time the discharge occurs; a counter which counts the clock pulses only when the output of the frequency divider represents preselected one of the two values, produces an output and concurrently, resets the count value each time the evaluation pulse is outputted; a subtracter for subtracting a constant reference value from the output of the counter; and an absolute-value circuit for outputting an absolute value of a resultant value of subtraction by the subtracter; wherein the evaluating means uses the output of the absolute-value circuit as the evaluation value for the dispersion.

The arrangement also may be such that the wire-discharge machining apparatus further comprises: a clock for generating clock pulses to be used as references for time measurement; a timer for outputting evaluation pulses at constant time intervals; a first frequency divider for producing an output logically-inverted each time the discharge occurs; a second frequency divider for producing an output logically-inverted each time the evaluation pulse is generated; a counter for performing a counting operation for the clock pulses only when the output of the first frequency divider represents preselected one of the two values, the counting operation being performed in the increasing direction only when the output of the second frequency divider represents preselected one of the two values, and in a decreasing direction when the output of the second frequency divider represents the other of the two values, and for outputting a count value and resetting the count value after performing the respective counting operations in the increasing direction and in the decreasing direction ver an equal period of time; and an absolute-value circuit for outputting an absolute value of the output of the counter; wherein the evaluating means uses the output of the absolute-value circuit as the evaluation value for the dispersion.

The arrangement also may be such that the wire-discharge machining apparatus further comprises: a clock for generating clock pulses to be used as references for time measurement; a timer for outputting evaluation pulses at constant time intervals; a frequency divider for producing an output logically-inverted each time the discharge occurs; a counter for performing a counting operation for the clock pulses in an increasing direction only when the output of the frequency divider represents preselected one of the two values, and in a decreasing direction being performed when the output of the frequency divider represents the other of the two values, and for outputting a count value and resetting the count value each time the evaluation pulse is generated; and an absolute-value circuit for outputting an absolute value of the output of the counter; wherein the evaluating means uses the output of the absolute-value circuit as the evaluation value for the dispersion.

The evaluating means may use, as the evaluation value for the dispersion, one of the mean value, the shifting mean value, and the sum of evaluation values for multiple dispersions.

The control means may perform the control so as to suppress machining energy when the evaluation value for the dispersion exceeds a predetermined reference value.

The control means also may be arranged to set a greater suppression for the machining energy which in accordance with an increase in the difference between the evaluation value and the reference value for the variation.

The control means may comprise at least one of: means for setting a long value of off-time; means for reducing orbital velocity of the wire electrode; means for setting a high electrode-position-controlling servo voltage; means for setting decreased duration of the discharge; and means for increasing impedance in a discharging circuit.

The above and other objects, features and advantages of the present invention will become clear from the following description of the preferred embodiment when the same is read in conjunction with the accompanying drawings.

DESCRIPTION OF THE PREFERRED EMBODIMENTS

With a view to overcome the above-described problems, the inventors fully investigated the conditions under which wire electrode breakage frequently occurs. The basic ideas and concepts of the invention were reached through this investigation. Prior to describing various devices and functions in the invention for solving the problems, a brief description will be given of findings in the investigation regarding the states of generation of discharge pulses at portions where breakage of the wire electrode frequently occurs.

Figure 1:
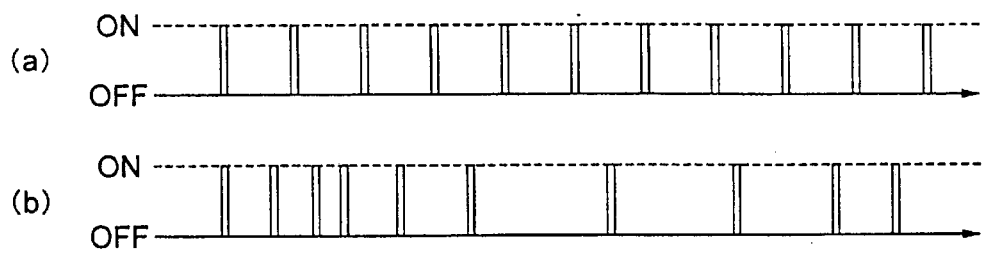
FIG. 1 is a view showing a status in which a pulse signal (discharge-occurrence pulse signal) is to be generated each time a discharge occurs.

FIG. 1 shows charts representing conditions in which a pulse signal to be outputted each time a discharge occurs (the pulse signal is referred to as a "discharge-occurrence pulse signal", hereinbelow). In the figure, the chart (a) shoes the state of generation of the discharge-occurrence pulse signal during normal machining, while the chart (b) shows the state of generation of the pulse signal under conditions which tend to cause wire breakage.

Generally, a wire-discharge machining apparatus controls the position of the wire electrode relative to a work that voltages values applied in a machining gap formed therebetween are kept constant. Therefore, over a long period of time, the average number of discharge-occurrence pulse signals generated in a unit of time is substantially constant.

Nevertheless, although discharges occur at substantially constant cycles under normal machining conditions as shown in chart (a) of FIG. 1, discharges occur at inconsistent intervals under machining conditions in which breakage of the wire electrode frequently takes place. This shows that the larger the variation in the period of time between one discharge occurring and another (referred to as a "discharge interval", hereinbelow), the higher the probability of breaks occurring in the wire electrode.

Also, it was observed that the above condition occurs not only at curved portions in the electrode path, but also at various portions of a work, such as stepped portions and end-surface portions. It proved also that the condition occurs irrelevantly to the number of discharge pulses.

To prevent occurrence of wire breakage, a wire-discharge machining apparatus of the present invention has a device for evaluating variation of status value such as discharge interval. In addition, the wire-discharge machining apparatus of the present invention has a device for controlling machining energy such that the machining energy is suppressed when a value of the evaluation value becomes excessively large.

To evaluate dispersion in measured values, a method that can be first considered is to calculate statistical values representing dispersion such as variance or standard deviations. A description will be given in detail of a first embodiment which relies on the variance.

An alternative method that can be considered is simpler than the above. This method is such that a function is defined to produce one of multiple types of outputs each time a discharge occurs, and evaluation is performed for the difference between an expected value of the function output (that is, a product of the value of the function output and the probability of appearance thereof) and a mean value of actual output values. This method is to make use of the fact that, when discharges are generated at constant intervals, the expected value is almost the same as the actual output value. In this way, when the difference between the actual output value and the expected value is large, this method determines the above-mentioned dispersion to be large. Examples of this method will be described as a second and subsequent embodiments.

The term "ignition delay time" is used to mean a time value which is obtained by subtracting, from the abovementioned discharge interval, the discharge time and the off time. The discharge time and the off time are both controlled by the control device. Therefore, dispersion in the discharge intervals is essentially equivalent to the dispersion of the ignition delay time.

Japanese Unexamined Patent Publication Nos. 1-27813 and 1-27814 disclose a discharge machining control apparatus having a machining-disturbance-model assumption device which assumes any irregular variation components included in the ignition delay time of the discharge waveforms as being a time series of machining disturbance model.

However, these disclosed examples use measured ignition delay time only to form a machining disturbance model such as an autoregressive (AR) model, and do not include any calculating process for determining an index which represents dispersion, such as variance, from the measured value of the ignition delay time. It is to be confirmed that the examples disclosed in the abovementioned publications do not evaluate dispersion in the ignition delay time, while the present invention evaluates dispersions in factors such as the ignition delay time and the discharge intervals. Thus, the concepts of the disclosed examples and the present invention are basically different.

First Embodiment

Figure 2:
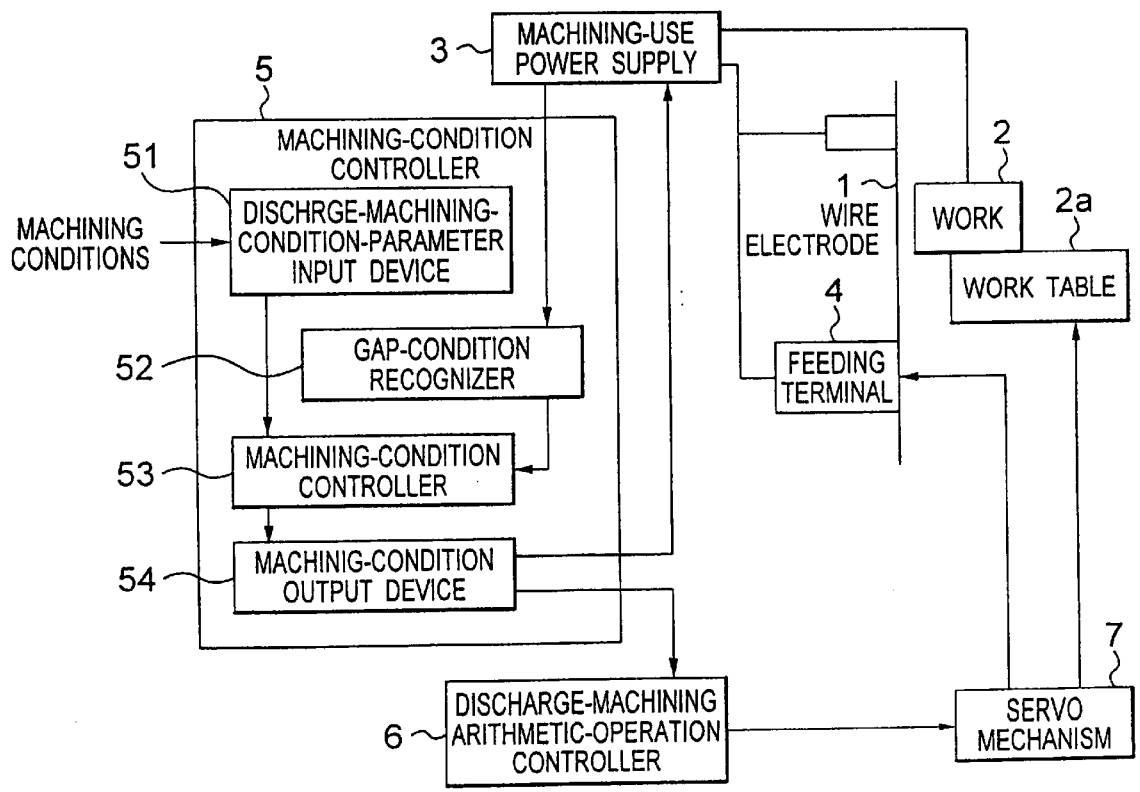
FIG. 2 is a schematic view of a configuration of a wire-discharge machining apparatus according to a first embodiment of the present invention.
Figure 3:
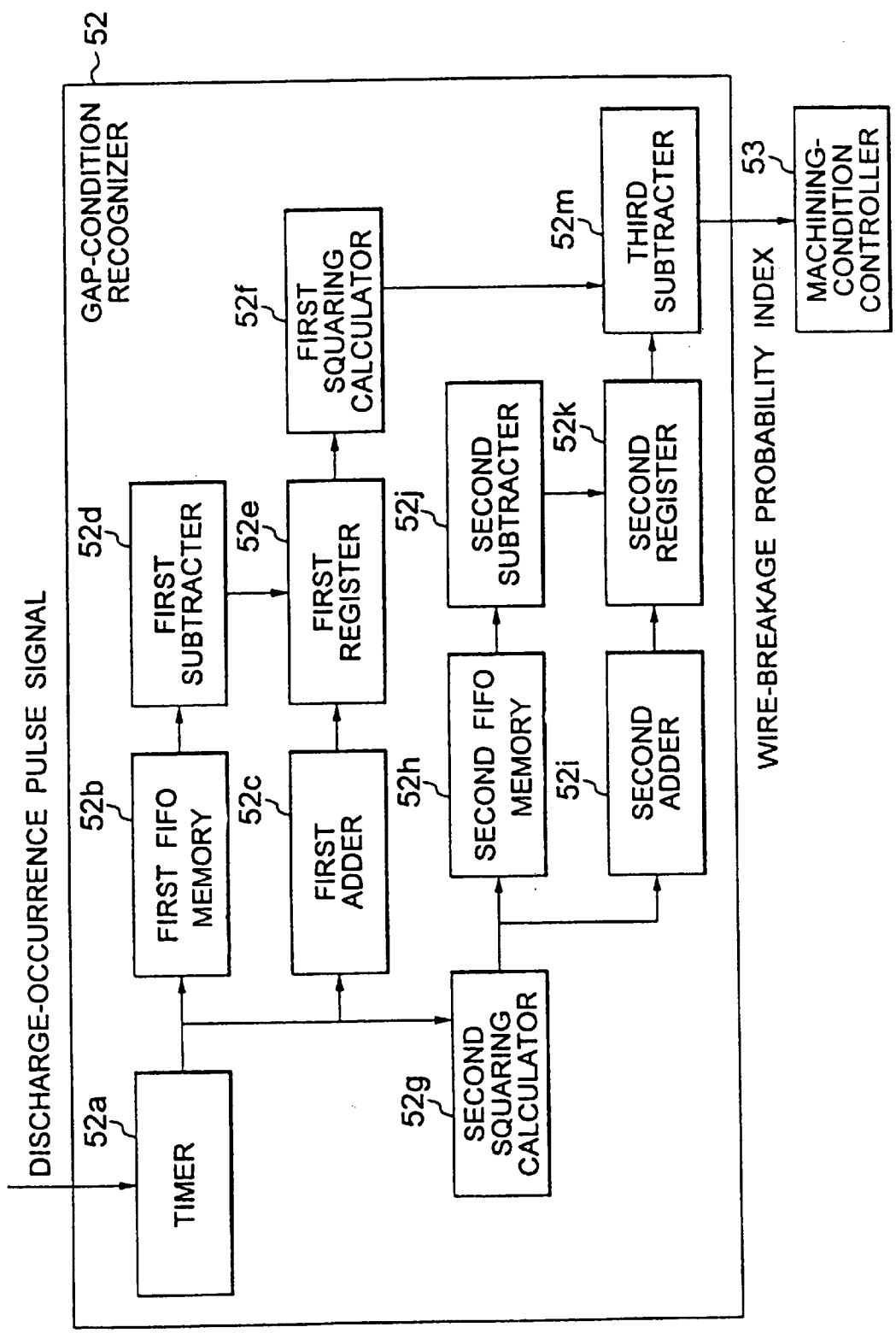
FIG. 3 is a schematic view showing details of a gap-condition recognition unit in the first embodiment of the present invention.

FIG. 2 is a block diagram showing the configuration of a wire discharge machining apparatus embodying the present invention. FIG. 3 is a block diagram showing the detail of a gap-condition recognition unit.

In FIG. 2, there are shown: a wire electrode 1, a work 2, a work table 2a, a working power supply 3, a feeding terminal 4, machining-condition controller 5, a discharge-machining arithmetic-operation controller 6, a servo mechanism 7, a machining-condition input device 51, the gap-condition recognizing unit 52 as an evaluating device, a machining-condition controller 53a, and a machining-condition output device 54.

In FIG. 3, there are shown: a timer 52a, a first FIFO (FIFO) matrix 52b, a first adder 52c, a first subtracter 52d, a first register 52e, a first squaring calculator 52f, a second squaring calculator 52g, a second FIFO matrix 52h, a second adder 52i, a second subtracter 52j, a second register 52k, and a third subtracter 52m.

In operation, referring to FIG. 2, the wire electrode 1 always runs from a wire-electrode source system (not shown) into a wire-electrode restoring unit (not shown). A space between the work 2 set on a work table 2a and the wire electrode 1 is filled with a machining liquid fed from a machining-liquid feeding system (not shown). Via the feeding terminal 4, the working power supply 3 applies voltage to a space between the wire electrode 1 and the work 2 so as to generate discharges. At this time, the machining-condition controller 5 described below sets machining conditions, such as the duration and discharge current of discharge pulses to be generated, and a discharge voltage.

The discharge-machining arithmetic-operation controller 6 moves the wire electrode 1 relative to the work 2 via the servomechanism 7 along a specified input machining path. At this time, the discharge-machining arithmetic-operation controller 6 controls relative positions and relative-movement speeds of the wire electrode 1, the work 2, and the work table 2a so that a mean voltage between the wire electrode 1 and the work 2 coincides with a command voltage set by the machining-condition controller 5 described below. This prevents frequent occurrence of short-circuiting and open-circuiting.

The machining-condition controller 5 includes the machining-condition input device 51 (an evaluating device), the machining-condition controller 53 (a control device), and the machining-condition output device 54. The machining-condition input device 51 receives data inputted for machining conditions, which are applied for normal machining. The machining conditions are either specified with data selected from an accompanying database or inputted prior to machining according to factors such as a board thickness and material characteristics of the work 2 and the diameter of the wire electrode 1. As a matter of course, the conditions may be arranged so as to be changeable during machining.

The gap-condition recognition unit 52 evaluates the dispersion in discharge intervals. In the first embodiment, it calculates a variance of the discharge intervals to evaluate the dispersion, as will be explained below in detail.

As shown in FIG. 3, the gap-condition recognition unit 52 consists of the following items: the timer 52a for measuring discharge intervals, the first FIFO memory 52b for storing measured values obtained by the timer 52a (timer values), the first adder 52c for adding the timer values, the first subtracter 52d for subtracting the timer values, the first register 52e for storing results of addition and subtraction of the timer values, the first squaring calculator 52f for squaring contents of the first register 52e, the second squaring calculator 52g for squaring the timer values, the second FIFO memory 52h for storing the squared values, the second adder 52i for summing the squared values, the second subtracter 52j for subtracting the squared values, the second register 52k for storing results of addition and subtraction of the squared values, and the third subtracter 52m for subtracting values of outputs of the first squaring calculator 52f from contents of second register 52k.

The timer 52a measures discharge-to-discharge periods of time (that is, discharge intervals) for each discharge pulse according to a pulse generated each time a discharge occurs (discharge-occurrence pulse signal), and outputs the measured values to the first FIFO memory 52b, the first adder 52c, and to the second squaring calculator 52g. For the discharge-occurrence pulse signal, for example, a signal which the machining power supply 3 uses to turn on or off a switching device or an output signal of a discharge-generation detector (not shown) is usable.

The first FIFO memory 52b has, for example, 64 storage rows as storage capacity in which discharge-interval measured values can be stored in the order from the latest. Upon receipt of an inputted new discharge-interval measurement value, the first FIFO memory 52b outputs the oldest discharge-interval measurement value to the first subtracter 52d and deletes the oldest value from its own storage. The first adder 52c adds the inputted new discharge-interval measurement value to contents of the first register 52e and stores the result in the same first register 52e.

The first subtracter 52d subtracts the oldest received discharge-interval measurement value from contents of the first register 52e and again stores the result in the same first register 52e. As a result, the first register 52e stores the sum of the discharge-interval measured values corresponding to the number of the storage rows available in the first FIFO memory 52b. As described above, arranging the number of the storage rows of the first FIFO memory 52b so as to be a power of 2 allows lower bits in the first register 52e to be negligible. This allows a shifting mean value of the discharge-interval measured values to be determined.

For example, the first FIFO memory 52b has 64 storage rows, as described above. In such a case, six lower bits in the first register 52e are disregarded, so that the seventh bit from the lowest is regarded as being the lowest bit. This example arrangement allows a shifting mean value over the past 64 discharge pulse intervals to be normally obtained. The shifting mean value representing the discharge intervals, which has been produced by shifting the bits (bit-shifting) as described above, is then squared and outputted by the first squaring calculator 52f to the third subtracter 52m.

The second squaring calculator 52g squares the received latest discharge-interval measurement value and outputs the result to the second FIFO memory 52h and also to the second adder 52i. The second FIFO memory 52h has the same number of the storage rows as that of the first FIFO memory 52b. Upon receipt of an input of a new squared value, the second FIFO memory 52h outputs the oldest squared value to the second subtracter 52j and deletes the oldest value from its own storage.

The second adder 52i adds the oldest received squared value to contents of the second register 52k and causes the result to be stored in the second register 52k. The second subtracter 52j subtracts the oldest received squared value from contents of the second register 52k, and causes the result of the subtraction to be stored again in the register 52k. As a result, the second register 52k stores the sum of the squared values representing discharge intervals corresponding to the number of the storage rows of the second FIFO memory 52h.

The number of the storage rows of the second FIFO memory 52h is set to be the same as that of the first FIFO memory 52b. Therefore, with an arrangement in which, for example, the seventh bit is assumed to be the lowest bit according to the same mechanism as in the case of the first register 52e, a shifting mean value of the square values representing discharge intervals for past 64 pulses can be obtained and stored in the second register 52k.

The third subtracter 52m subtracts a value of an output of the first squaring calculator 52f (that is, a squared value of the shifting mean value of the discharge intervals) from the shifting mean value of the squares of the discharge intervals, which has thus been obtained in the bit-shifting manner. In this way, the third subtracter 52m calculates the variance of the discharge intervals. Finally, the third subtracter 52m outputs the calculated variance to the machining-condition controller 53, as a parameter representing the probability of wire breakage (which is referred to as a "wire-breakage probability index", hereinbelow).

If the received wire-breakage probability index is smaller than a predetermined set value, the machining-condition controller 53 outputs the machining conditions inputted to the machining-condition input device 51 as it is to the machining-condition output device 54. However, if the received wire-breakage probability index is greater than the predetermined value, the machining-condition controller 53 changes the machining conditions so as to reduce machining energy and outputs the changed machining conditions to the machining-condition output device 54.

To reduce the machining energy, the machining conditions can be changed in a number of ways, for example, by increasing the off time, reducing running speeds of the wire electrode 1, increasing the command value for a mean machining voltage, reducing the discharge time, increasing impedance in a power-feeding path, and reducing the maximum discharge current value.

Upon receipt of the output from the machining-condition controller 53, the machining-condition output device 54 sets machining conditions for the discharge-machining arithmetic-operation controller 6 and the machining power supply 3.

As described above, the wire-discharge machining apparatus of this embodiment relies on the evaluation of dispersion of the time intervals at which discharges occur. Therefore, all portions, such as corners in the electrode path as well as stepped portions and end-surface portions of the work 2, where wire-breakage is more likely to occur than at other normal portions, can duly be detected without being affected by wire-breakage prevention control. Therefore, wire-breakage prevention control can satisfactorily be implemented, and accordingly, machining performance can significantly be improved.

Furthermore, according to the first embodiment, since the variance of the discharge time intervals is evaluated, probabilities of breakage of the wire electrode 1 can be evaluated without being influenced by control of machining energy. This allows wire-breakage prevention control to be performed appropriately and efficiently for portions, such as corners in the machining path as well as end-surface portions and indented portions of the work 2, where wire-breakage is more likely to occur than at other normal portions.

In the described first embodiment, for obtaining the mean values, the number of the storage rows of the FIFO memories 52b and 52h is set to a power of 2, and dividing operations are substituted by bit-shifting. However, other types of FIFO memories may of course be used, on condition that a suitable frequency divider is available. Although the described first embodiment employs multiple adders, subtracters, and squaring calculators, this is not exclusive and these components may be singular and used in a timesharing manner.

Also, in the described first embodiment, the FIFO memories, adders, subtracters, and multiplication calculators are used to determine the variance one by one. However, the arrangement may of course be such that discharge-interval measured values over a predetermined number of successive discharge pulses or over a predetermined period of time are stored in a memory, so that the variance values are calculated at once in a batch In the described first embodiment, the variance is determined by subtracting the square of the mean value from the square mean of the measured values. However, the variance may be determined in other manners, such as that to obtain from the mean of squares of the differences between measured values and the mean value thereof.

Also, in the described first embodiment, the variance value representing the discharge intervals per se is used as the wire-breakage probability index. However, other indices which monotonicly increases or decreases according to an increase in the dispersion values may also be used to produce similar advantages. With an index that decreases monotonicly, however, when the index decreases to a level lower than a predetermined value, machining conditions must of course be controlled so as to reduce machining energy.

The first embodiment as described employs sample variance as the variance value. The sample variance is determined by dividing the square of the difference from a mean value by the number of the samples. This, however, is only illustrative and an unbiased variance which is an unbiased predicted amount of variance may be used instead of the sample variance. As a matter of course, however, other indices commonly used to evaluate variance may be used. Such indices include a standard variance, a variation coefficient, square mean, skewness, kurtosis, a mean deviation, and an absolute value of the difference from a mean value.

The first embodiment evaluates the dispersion of the discharge intervals. However, other types of dispersions may of course be evaluated to provide similar results. Other types of dispersions include dispersion in discharge frequencies having an inverse relationship to the discharge intervals (that is, the number of discharges occurring in a unit of time), and dispersion in ignition delay time which is determined by subtracting, from the discharge interval, the discharge duration and the off time that are controllable.

Also, the indices successively obtained are used as they are for the wire-breakage probability indices in the first embodiment. However, the indices actually obtained are significantly fluctuated. To solve this problem, it is preferred that a mean value or a shifting mean value over a plurality of indices thus obtained is used as the wire-breakage probability index. This allows even more stable and suitable operation to be realized.

In the described first embodiment, when the wire-breakage probability index exceeds the reference value, the machining conditions are uniformly modified. More preferably, however, an arrangement may be such that the amount of modification in the machining conditions is set larger in accordance with the increase in the amount by which the reference value is exceeded.

Also, in the first embodiment, when the wire-breakage probability index is large, control is performed to reduce the machining energy. As practical measure for reducing the energy, any control, for example, control by increasing flow or pressure of the machining liquid, or control by increasing winding speeds of the wire electrode 1, may be employed, as long as the control works to suppress the occurrence of wire-breakage.

In the described first embodiment, the machining conditions are automatically modified according to the wire-breakage probability index. However, the arrangement may be such that the wire-breakage probability indices are only displayed, while the modification of the machining conditions is effected by an operator in accordance with the indices displayed.

Second Embodiment

Hereinbelow, a description will be given of a second embodiment of the present invention. However, for the second embodiment and subsequent embodiments, a description will be mainly focused on a gap-condition recognition unit 52 which is different from the gap-condition recognition unit 52 used in the first embodiment. Nevertheless, the gap-condition recognition unit 52 in the second embodiment and other machining-condition recognizers 52 in the subsequent embodiments are still the same as the gap-condition recognition unit 52 in the first embodiment in that they are primarily designed to evaluate the dispersion of discharge intervals. As mentioned above, however, a description will be focussed on the basic configuration, which is different depending upon the embodiment.

Figure 4:
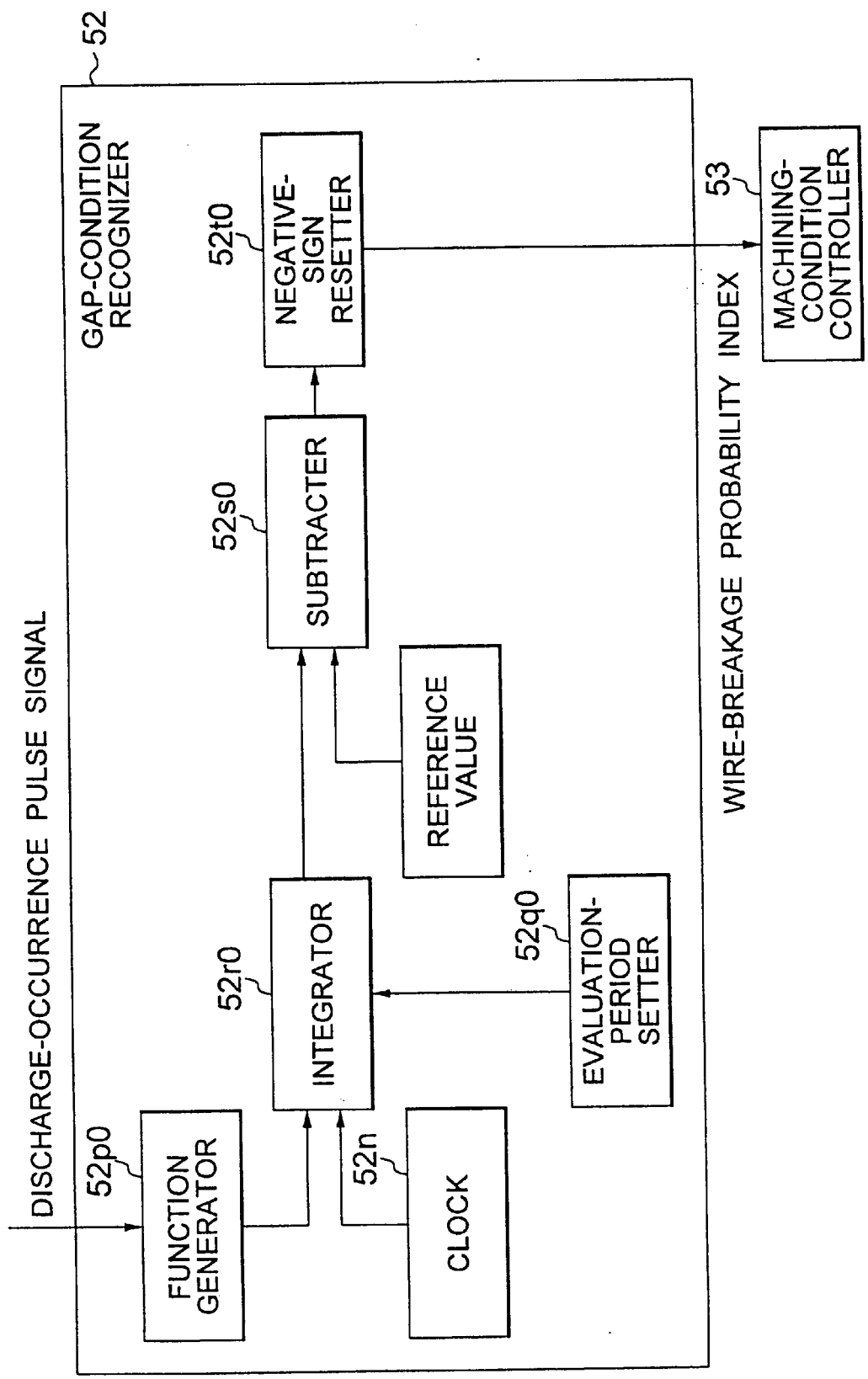
FIG. 4 is a schematic view of a basic configuration of a gap-condition recognition unit in second to fourth embodiments of the present invention.

FIG. 4 is a schematic view of a basic configuration of the gap-condition recognition unit 52 to be described in connection with the second and subsequent embodiments. In the figure, 52$n$ denotes a clock, 52$p$0 denotes a function generator, 52$q$0 denotes an evaluation-period setter, 52$r$0 denotes an integrator, 52$s$0 denotes a subtracter, and 52$t$0 denotes a negative-sign resetter.

The function generator 52$p$0 generates arbitrary functions excluding constant functions which always represent constant values. An example arrangement for the function generator 52$p$0 may be such that "1", "1", "2", and "3" are repeatedly and sequentially outputted each time a discharge occurs. Another example arrangement may be such that "1" is outputted for a probability of ½, "2" is outputted for a probability of ¼, and "3" for a probability of ¼ at random each time the discharge occurs. As a matter of course, the output function values need not be constant while no discharge is occurring, and a random number of a mean value "1" and a random number of a mean value "2" may be alternately outputted each time the discharge occurs.

The clock 52$n$ generates clock pulses at a fixed cycle, which are used as references for time measurement at a constant cycle. The evaluation-period setter 52$q$0 sets a period in which one period of evaluation is performed for the wire-breakage probability index (which is referred to as an "evaluation period", hereinafter). This can be realized, for example, by using a counter that measures a predetermined number of clock pulses.

The integrator 52$r$0 integrates outputs of the function generator 52$p$0 during the evaluation period and outputs the result to the subtracter 52$s$. For example, it samples outputs of the function generator 52$p$0 at a rising stage of a clock pulse, adds a value of the sample to storage contents in the integrator 52$r$0, and concurrently, resets the storage contents after outputting the storage contents at the end of the evaluation period.

The subtracter 52$s$0 subtracts a reference value from the output of the integrator 52$r$0. At this time, the reference value is set to be the product of an expected value of a function output generated by the function generator 52$p$0 (that is, a product of a function output value and the probability of appearance of the output value) and a clock-count value which is equivalent to the evaluation period. This arrangement is made for the reason described below. When discharges occur regularly at a fixed sampling period, the integrator 52$r$0 accumulates the outputs of the function generator 52$p$0 at constant cycles. In this case, the output of the integrator 52$r$0 is the same as the product of the expected value and the clock-count value equivalent to the evaluation period. In other words, it can be said that the larger the difference between the output of the integrator and the reference value, the larger the dispersion of the discharge intervals. When negative values of the subtraction result are converted to positive values by using the negative-sign resetter 52$t$0, the larger the value, the larger the dispersion of the discharge intervals. For this reason, the value can be considered as being a wire-breakage probability index. The negative-sign resetter may be, for example, an absolute value circuit or a squaring circuit.

The above-described basic configuration subtracts, from the output of the integrator, the reference value obtained by multiplying the expected value of the function output with the clock-count value which is equivalent to the evaluation period. However, the arrangement also may be such that the reference value is set to be the same as the expected value, and the integration is performed after subtraction of the reference value from a value of the output of the function generator, or the subtraction of the reference value is effected after the output of the integrator is divided by the clock-count value which is equivalent to the evaluation period.

The second and subsequent embodiments have the basic configuration described hereinbefore. A description will now be given of the second embodiment of the present invention.

The second embodiment employs a frequency divider as the function generator 52$p$0. The frequency divider produces an output logically inverted each time the discharge occurs. Thus, in the second embodiment, the function generator 52$p$0 is assumed to output "0" and "1" alternately each time a discharge occurs. In this case, therefore, the integrator 52$r$0 can be substituted by a counter for counting clock pulses only while the frequency divider is outputting preselected one of the values (for example, a "high" value).

Also, the probabilities of appearance of the function output are ½ and ½ for both "0" and "1", respectively. Therefore, the number of the clock pulses equivalent to the length of ½ of the evaluation period may be used as the reference value which is to be set on the subtracter 52s0. At the same time, an absolute value circuit is used as the negative-sign resetter 52t0, while a timer that counts clock pulses is used as the evaluation-period setter. The second embodiment will now be described in more detail.

Figure 5:
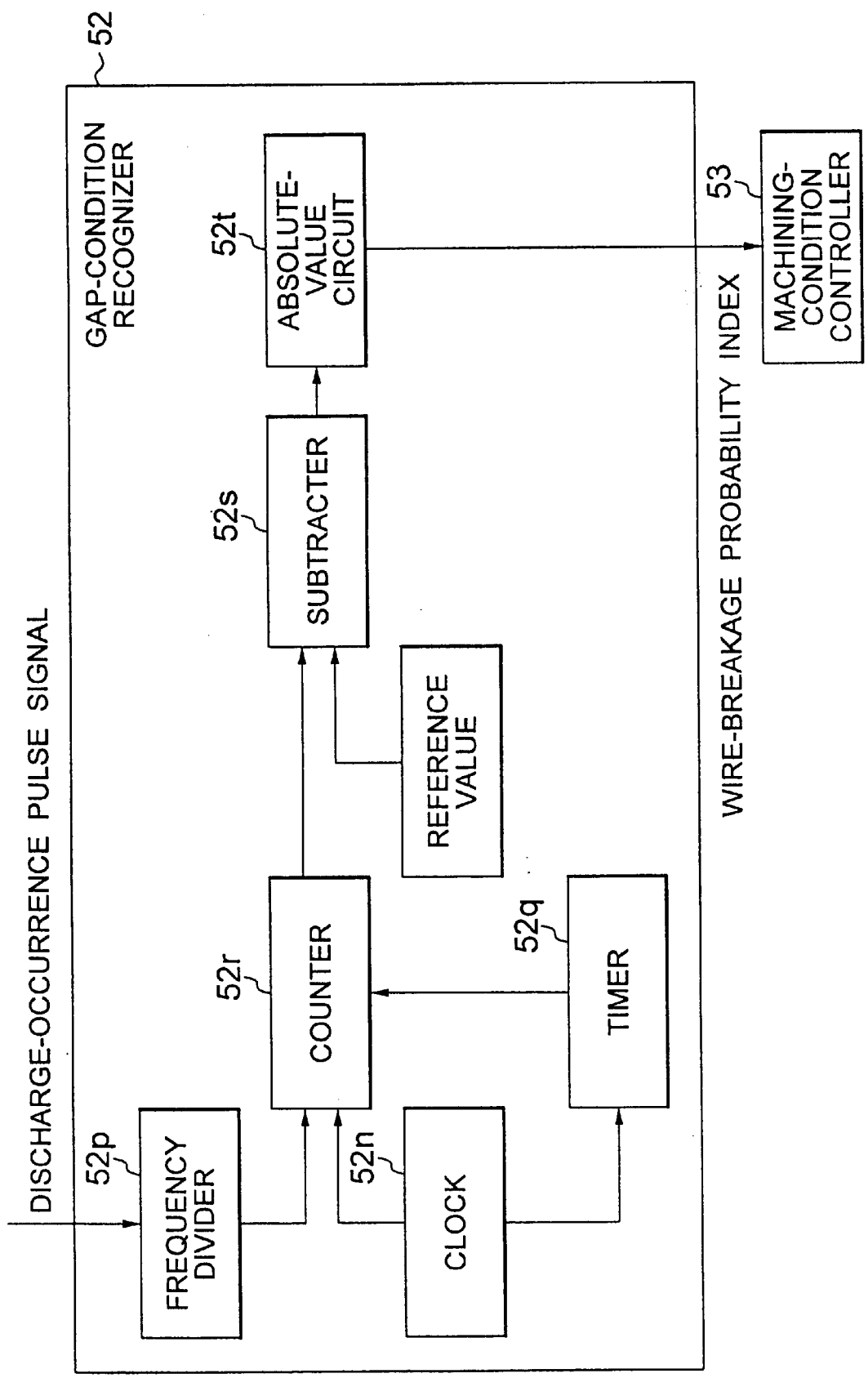
FIG. 5 is a schematic view of a configuration of a wire-discharge machining apparatus according to the second embodiment of the present invention.
Figure 6:
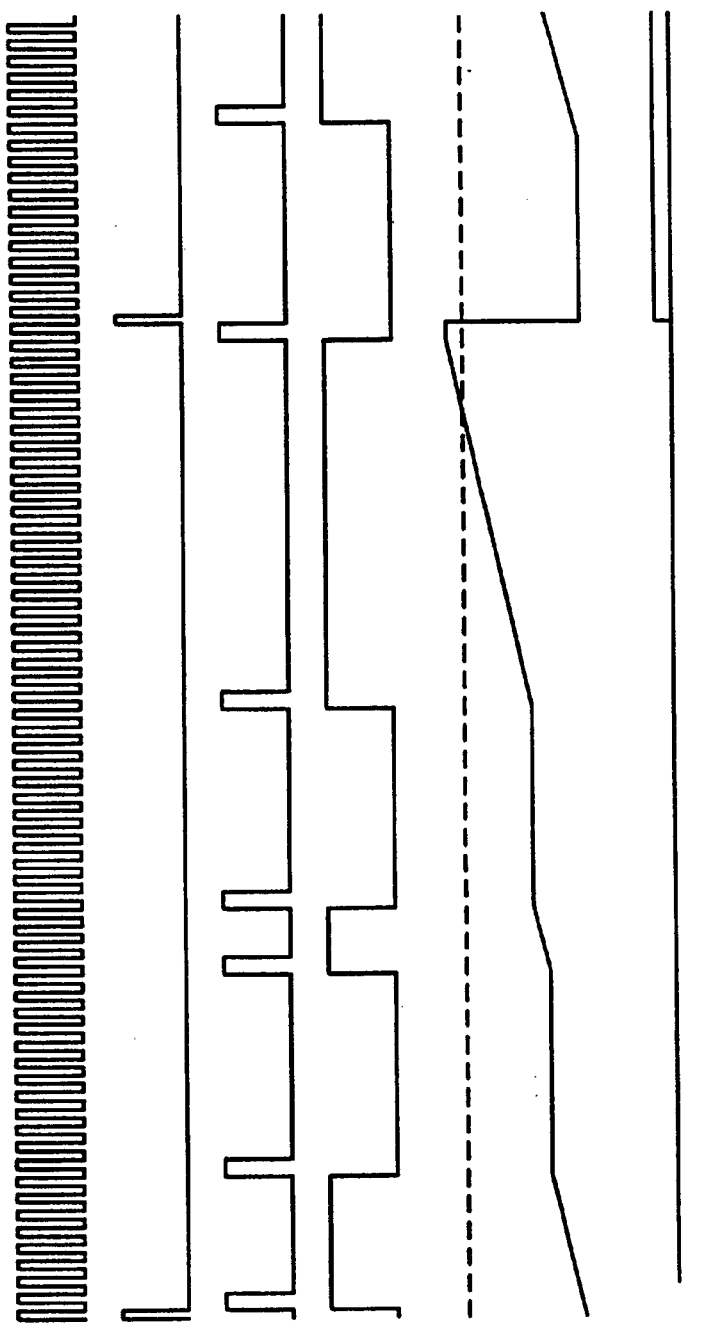
FIG. 6 shows timing charts showing the operation of the second embodiment of the present invention.

FIG. 5 is a block diagram of the gap-condition recognition unit 52 of the second embodiment. FIG. 6 shows timing charts illustrative of the operations of the second embodiment. The same reference symbols are given for portions, which are the same as or equivalent to those described above, and a description thereof is omitted to avoid redundancy.

In FIG. 5, there are shown: a frequency divider 52p, a timer 52q, a counter 52r, and an absolute-value circuit 52t. In FIG. 6, chart (a) shows the timing of an output of the clock 52n, chart (b) shows the timing of an output of the timer 52q, chart (c) shows the timing of discharge-occurrence pulse signal, chart (d) shows the timing of an output of the frequency divider 52p, chart (e) shows the timing of a count value of the counter 52r, and chart (f) shows the timing of an output of the absolute-value circuit 52t.

The second embodiment is distinguished from the first embodiment only by the configuration and nature of the gap-condition recognition unit 52. The description therefore will be focused on the gap-condition recognition unit 52.

The gap-condition recognition unit 52 has a clock 52n, a frequency divider 52p, a timer 52q, a counter 52r, and an absolute-value circuit 52t. The clock 52n feeds pulses to be used as references for time measurement. The frequency divider 52p produces an output inverted each time the discharge-occurrence pulse signal is received. The timer 52q determines the evaluation period. The counter 52r counts pulses which the clock 52n outputs while the frequency divider 52p is outputting the preselected one of the values and for outputting and resetting the obtained count value at the end of the evaluation period. The subtracter 52s calculates differences between the counting result and the reference values. The absolute-value circuit 52t outputs an absolute value of the subtraction result. The gap-condition recognition unit 52 is thus configured and operates as described below.

The clock 52n constantly generates clock signals, which are used as references for time measurement, as shown in the chart (a) in FIG. 6. The timer 52q generates pulses for each of the evaluation periods, as shown in the chart (b) in FIG. 6. The evaluation periods are determined according to the frequency of the clock 52n and a set value of the timer 52q, and these values may require adjustment depending on the machining conditions to be applied. Preferably, the frequency of the clock 52n is in a range of 100 kHz to 10 MHz, and the set value of the timer 52q is in a range of 10 msec to 0.1 msec.

The frequency divider 52p divides frequency of the discharge-occurrence pulse signal by a demultiplication factor of two, and outputs a signal as shown in the chart (d) in FIG. 6. The counter 52r counts output pulses of the clock 52n only when the output of the frequency divider 52p represents preselected one of the values (for example, a "high" value), and resets the count after outputting the count value according to an input from the timer 52q. The chart (e) in FIG. 6 shows a count value of the counter 52r.

The dotted line in the chart (e) of FIG. 6 represents a reference value determined by the subtracter 52s described below. A reference value predetermined by the subtracter 52s is subtracted from the output of the counter 52r. The reference value is determined in the following manner.

As is apparent from the above-described operation, since the counter 52r counts the pulses only when the output of the frequency divider 52p is, for example, of a "high" value, the frequency divider 52p can be assumed to be a function generator which produces the respective outputs "0" and "1" on a probability of ½. Concurrently, the counter 52r can be assumed to be an integrator, which produces outputs of the frequency divider 52p. Since an expected value of the outputs of the frequency divider 52p is ½, a count value equivalent to ½ the length of the evaluation period may be set as the reference value. Finally, the subtraction result is converted by the absolute-value circuit 52t to an absolute value, and the absolute value is outputted as a wire-breakage probability index. The chart (f) in FIG. 6 represents an output value of the absolute-value circuit 52t.

As described above, the second embodiment has a simpler configuration than the first embodiment, but is still capable of evaluating the discharge intervals. The second embodiment therefore allows wire-breakage to be prevented in a manner simpler than in the first embodiment.

In the described second embodiment, the evaluation period is continuous. However, even when the evaluation period is divided into a plurality of time sections, similar advantages can be obtained.

The described second embodiment uses, for the purpose of controlling the counter, the frequency divider 52p which outputs one of the two different values on the probability of ½. However, if the appearance probability is known in advance, any type of function generator may be used.

For example, a function generator for sequentially outputting three or more types of values can be used. Also, a function generator for outputting a value selectively from multiple output values on a predetermined probability according to random numbers internally generated can be considered.

Also, the above-described functions are not restricted to those maintaining constant values before a discharge-occurrence pulse signal is inputted. For example, similar effects can be realized even with functions for alternately generating two types of random numbers, which are different from each other in distribution, each time the discharge-occurrence pulse signal is inputted. In this connection, a matter to be noted with the described second embodiment is as follows. In the described embodiment, the output of the function generator represents one of "0" and "1". The integration therefore can be implemented by summing the value only when the output is "1", without making any addition when the output is "0". However, generally, a multiplication processing is required at the time of the integration of the outputs. For example, when the output value represents "2", a configuration must be such that the number of pulses which are two times the number of the clock pulses are integrated.

In the described second embodiment, the counter 52r operates only when the frequency divider 52p produces a preselected one of the two values. This, however, is not exclusive and the arrangement may be such that the counter operates in response to multiple values. For example, the counter may be one that operates in response to two out of three types of output values of a function generator.

Also, in the described second embodiment, the output of the absolute-value circuit 52t is used as it is as the wire-breakage probability index. This, however, is only illustrative and the arrangement may be such that a different index which monotonicly increases or decreases in response to an increase in the absolute value is used as the breakage probability index. Also, in the described first embodiment, the indexes (outputs of the absolute-value circuit 52*t*) momentarily obtained are used as they are as the wire-breakage probability indices. However, the arrangement may such that multiple mean values or shifting mean values of the thus-obtained indexes are used as the wire-breakage probability indices, thereby allowing even more stable and suitable operation to be implemented, as in the case of the first embodiment.

Third Embodiment

A description will now be given of the third embodiment of the present invention.

The third embodiment is substantially the same as the second embodiment in configuration including the arrangement in which a frequency divider, the output of which is logically inverted each time a discharge-occurrence pulse signal is generated, is used as the function generator 52*p*0. The third embodiment, however, is distinguished from the second embodiment by the following feature. Namely, in the third embodiment, the evaluation period is divided into two parts, i.e., an earlier half sub-period and a latter half sub-period, and the outputs of the function generator 52*p*0 are integrated in opposite directions in the earlier and latter half sub-periods, while the reference value on the subtracter is set to be "0". This means that the subtracter be dispensed with.

Figure 7:
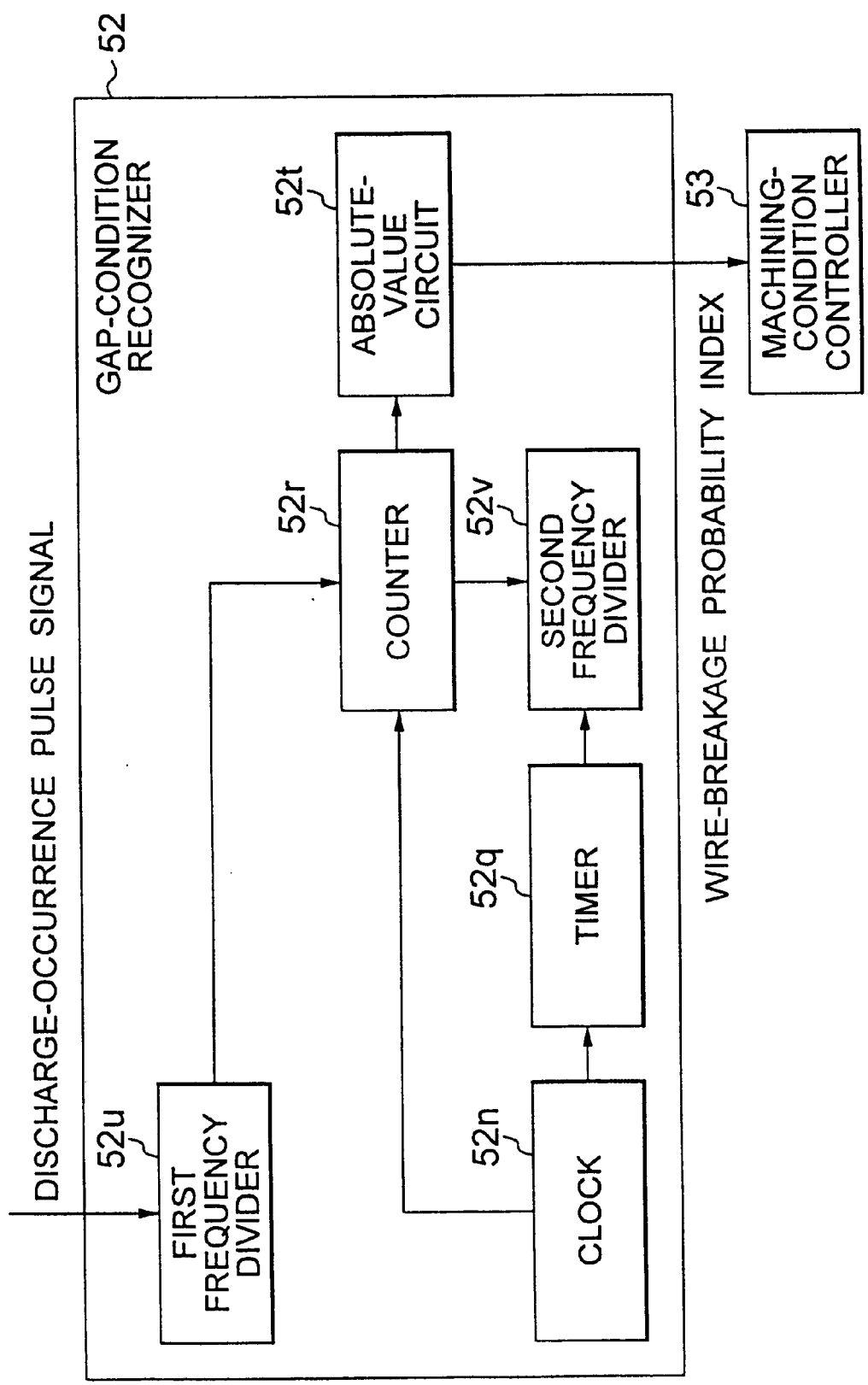
FIG. 7 is a detailed lock diagram of a configuration of a gap-condition recognition unit showing a configuration of a wire-discharge machining apparatus according to the third embodiment of the present invention.
Figure 8:
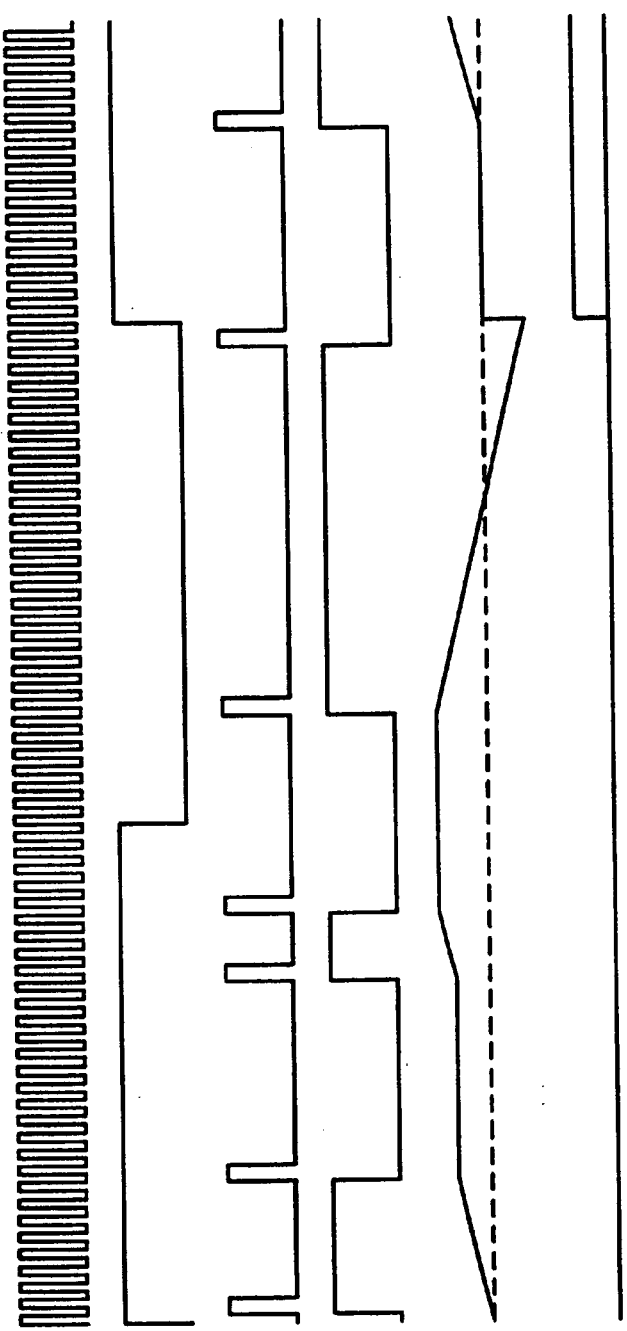
FIG. 8 shows timing charts showing the operation of the third embodiment of the present invention.

FIG. 7 is a schematic view of a gap-condition recognition unit 52 of the third embodiment. FIG. 8 shows timing charts of the third embodiment. Portions which are the same as or equivalent to those in the preceding embodiments are given the same reference symbols, and a description thereof is omitted to avoid redundancy.

In FIG. 7, 52*u* denotes a first frequency divider, and 52*v* denotes a second frequency divider. In FIG. 8, chart (a) is a timing chart of an output of a clock 52*n*, chart (b) is a timing chart of an output of the second frequency divider 52*v*, chart (c) is a timing chart of a discharge-occurrence pulse signal, chart (d) is a timing chart of the first frequency divider 52*u*, chart (e) is a timing chart of a count value of a counter 52*r*, and chart (f) is a timing chart of an output of an absolute-value circuit 52*t*.

A description will be given of operation of the gap-condition recognition unit 52, since the third embodiment differs from the second embodiment only in the configuration and operation of the gap-condition recognition unit. However, the gap-condition recognition unit 52 is still the same as that in the second embodiment in that it evaluates deviations in function outputs which vary depending on generation of discharge-occurrence pulse signals.

In the third embodiment, the evaluation period is divided into two sub-periods, wherein the counter 52*r* performs upward or incremental counting in one sub-period and performs downward or decremental counting in the other sub-period, while the reference value is set to zero to eliminate the necessity of the subtracter. This is the sole point which discriminates the third embodiment from the second embodiment.

In the third embodiment, the gap-condition recognition unit 52 has the first frequency divider 52*u*, a clock 52*n*, a timer 52*q*, the second frequency divider 52*v*, a counter 52*r*, and an absolute-value circuit 52*t*. The first frequency divider 52*u* produces an output inverted each time a discharge-occurrence pulse signal is received. The clock 52*n* feeds pulses to be used as references for time measurement. The timer 52*q* determines one half of the evaluation period. The second frequency divider 52*v* produces an output which is inverted in response to the output of the timer 52*q*. The counter 52*r* changes the counting direction and counts the outputs of the clock 52*n* while the first frequency divider 52*u* is outputting a specific value. Also, the counter 52*r* outputs and resets the obtained count value for each evaluation period. The absolute-value circuit 52*t* outputs an absolute value of the counting result. The gap-condition recognition unit 52 is thus configured and operates as described below.

The clock 52*n* constantly generates clock signals which are used as references for time measurement, as shown in the chart (a) in FIG. 8. The timer 52*q* generates pulses for the half period of each of the evaluation periods according to signals from the clock 52*n*. Frequency of an output of the timer 52*q* is divided into two by the second frequency divider 52*v*, thereby forming a signal as shown in the chart (b) in FIG. 8. The evaluation period, which is determined according to the frequency of the clock 52*n* and the set value of the timer 52*q*, may require adjustment depending on the machining conditions to be applied. Preferably, the frequency of the clock 52*n* is in a range of 100 kHz to 10 MHz, and the set value of the timer 52*q* is in a range of 10 msec to 0.1 msec.

The first frequency divider 52*u* divides frequency of the discharge-occurrence pulse signal into two as shown in the chart (c) in FIG. 8 by a demultiplication factor of two and outputs a signal as shown in the chart (d).

The counter 52*r* counts the output pulses of the clock 52*n* only when the output of the first frequency divider 52*u* represents preselected one of the two values (for example, "high" values). The counter 52*r* performs incremental counting only when the second frequency divider 52*v* outputs preselected one of the two values (for example, a "high" value), whereas the counting direction is set to be decremental when the second frequency divider 52*v* outputs the other of the two values (for example, a "low" value).

At the end of the evaluation period, the counter 52*r* outputs the count value, and then resets it. The chart (e) in FIG. 8 shows a count value of the counter 52*r*. In this way, the third embodiment determines the direction of the integration according to outputs of the second frequency divider 52*v* when integrating the outputs of the first frequency divider 52*u* which works as the function generator. As is apparent from the operation of the second frequency divider 52*v*, since time of integration in the positive or incremental direction is the same as time of integration in the negative or decremental direction, the reference value is naturally set to zero, whereby the subtracter is no more necessary. The dotted line in (e) of FIG. 8 represents a reference value of zero. Finally, the count value is converted into an absolute value by the absolute-value circuit 52*t*, and the absolute value thus obtained is outputted as a wire-breakage probability index. The chart (f) in FIG. 8 represents the output value of the absolute-value circuit 52*t*.

The configuration as described above allows the same results as in the case of the second embodiment to be obtained without requiring the subtracter. It is thus possible to simplify the configuration.

The third embodiment produces the same advantages as those offered by the second embodiment, as summarized below.

The same advantages as that of the second embodiment can be obtained, despite the evaluation period is divided into a plurality of sub-periods. Also, the same advantages can be obtained even in an arrangement made such that different indices-simply increasing or decreasing in response to an increase in the absolute value are outputted. Furthermore, more stable and suitable operation can be implemented when the arrangement is such that a mean value or a shifting mean value over a plurality of index values are used as the wire-breakage probability indices.

In the third embodiment as described, the first half of the evaluation period is set as the region for performing incremental counting, while the latter half of the evaluation period is set as the region for performing decremental counting. This, however, is not exclusive and the evaluation period may be further divided as long as the total length of regions for incremental counting is the same as the total length of regions for decremental counting. For example, the evaluation period may be quartered, thereby setting the first and third regions for the incremental counting and setting the second and fourth regions for the decremental counting. Also, an arrangement may be such that even with two regions whose lengths differ from each other, as in the case where the length of one region is set half to obtain doubled count values, the reference value is set to substantially zero by suitably weighting the count values.

Also, in the described third embodiment, a single counter is used to perform both the incremental counting for the first half of the evaluation period and the decremental counting for the latter half of the evaluation period. As a matter of course, however, the arrangement may be such that the decremental counting is performed in the first half and the incremental counting is performed in the latter half of the evaluation period. The arrangement also may be such that a counter for operating for the first half and a counter for operating for the latter half are separately provided, and the both count values are subjected to subtraction at the end of the evaluation period.

Also, in the described third embodiment, the frequency dividers 52u and 52v for outputting one of two types of the values on a probability of ½ for controlling the counter. However, as in the case of the second embodiment, any function generator may be used as long as the appearance probability is known in advance for each of the output values.

In the third embodiment as described, the output value of the function generator is one of "0" and "1", so that the integration can be executed by counting the values in the positive or incremental direction for the first half of the evaluation period and in the opposite direction for the later half of the evaluation period. Generally, however, multiplication must be performed for integration of output values. This is also the same as in the case of the second embodiment.

Also, according to the described third embodiment, the function generator may be regarded as being a combination of the two frequency dividers 52u and 52v. This allows interpretation of outputs of the function generator to be "0" for not operating the counter, "1" for counting in the positive or incremental direction, and "−1" for counting in the opposite direction.

Fourth Embodiment

Hereinbelow, a description will be given of a fourth embodiment of the present invention.

The fourth embodiment is substantially the same as the second embodiment in configuration including the arrangement in which a frequency divider is provided as the function generator 52p0, which produces an output logically-inverted each time the discharge-occurrence pulse signal is generated.

Thus, the function generator 52p0 is assumed to alternately output values "−1" and "1" (not "0" and "1") each time a discharge occurs. Therefore, an integrator is substituted by a counter that performs incremental counting for clock pulses while the function generator is outputting value of "1" and that performs decremental counting the clock pulses while the function generator is outputting value of "−1".

Also, since the appearance probability is ½ for each of the outputs "1" and "−1", the reference value to be set for a subtracter would be zero. This means that the subtracter can be eliminated as in the case of the third embodiment.

Figure 9:
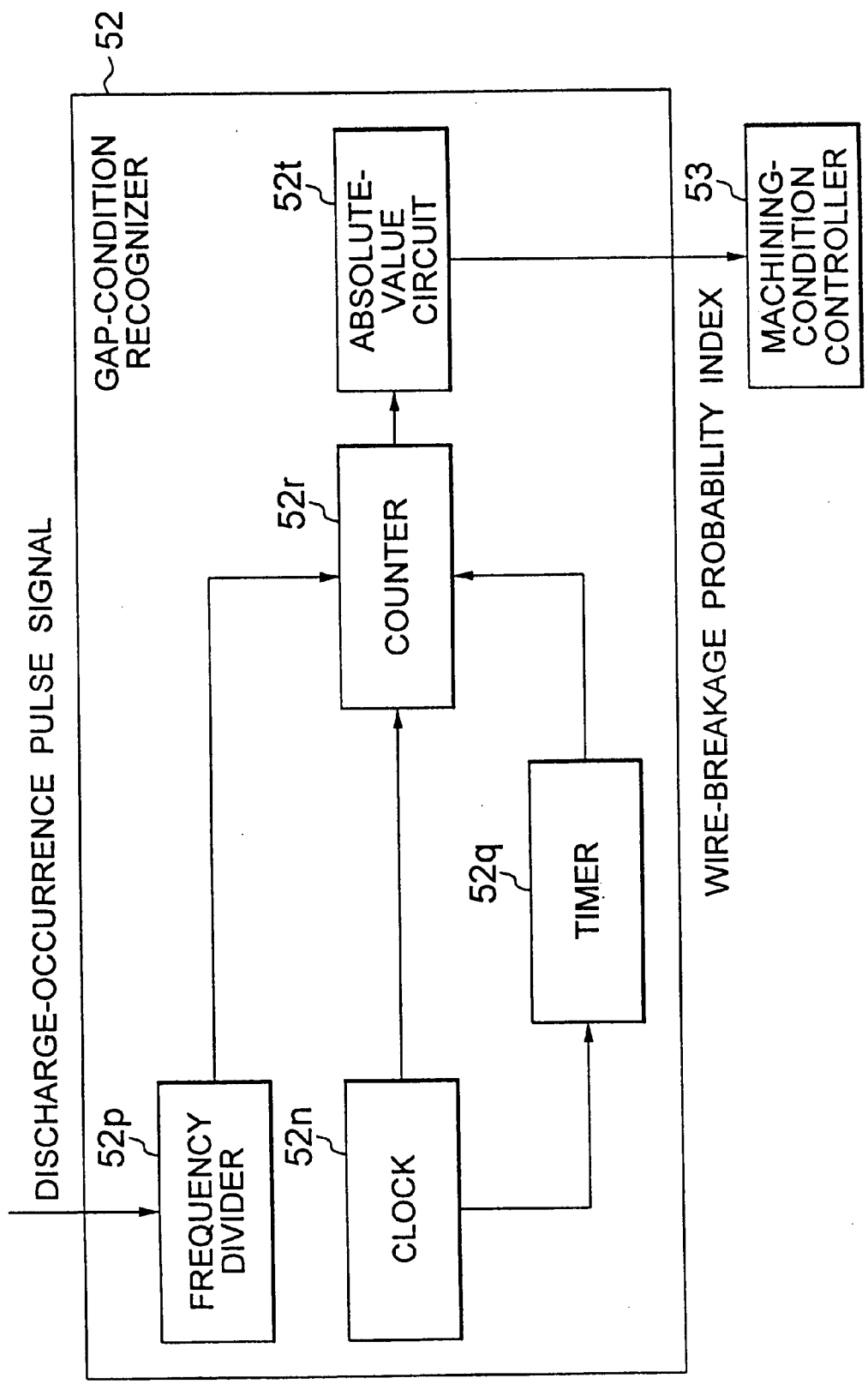
FIG. 9 is a detailed block diagram of a configuration of a gap-condition recognition unit showing a configuration of a wire-discharge machining apparatus according to the fourth embodiment of the present invention.
Figure 10:
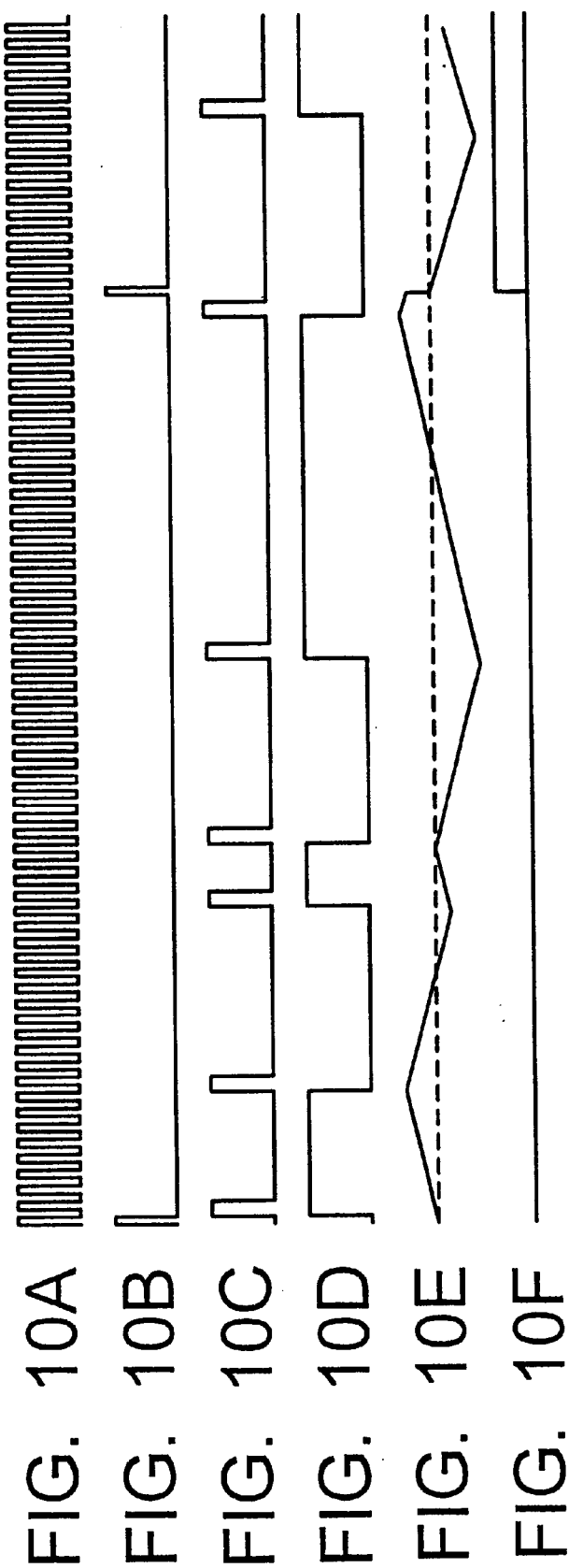
FIG. 10 shows timing charts showing the operation of the fourth embodiment of the present invention.
Figure 11:
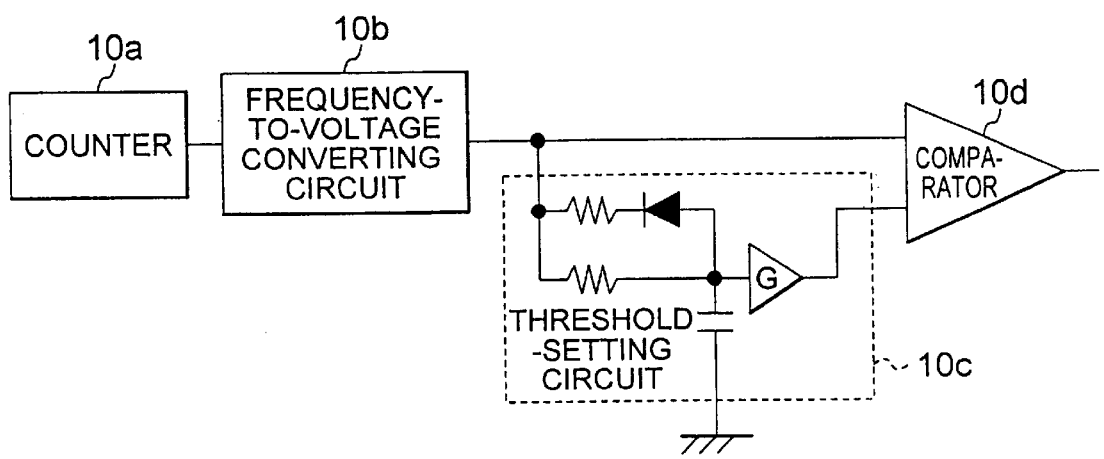
FIG. 11 is a view of an example discharge-machining-condition adjusting circuit in a conventional wire-discharge machining apparatus.
Figure 12:
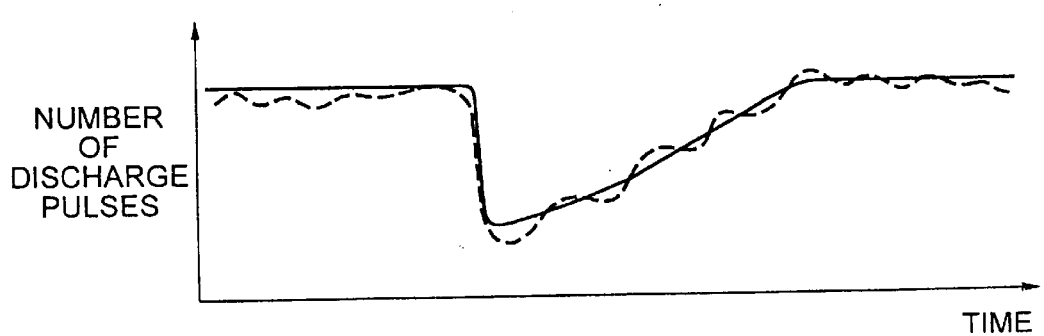
FIG. 12 shows variation in the number of pulses and thresholds of the pulses before and after passing through curved portions in an electrode path.

FIG. 9 is a schematic view of a gap-condition recognition unit 52 of the fourth embodiment. FIG. 10 shows timing charts of the fourth embodiment. Portions that are the same as and equivalent to those in the preceding embodiments are given the same reference symbols, and a description thereof is omitted to avoid redundancy.

In FIG. 10, a chart (a) is a timing chart of an output of a clock 52n, a chart (b) is a timing chart of an output of a timer 52q, a chart (c) is a timing chart of a discharge-occurrence pulse signal, a chart (d) is a timing chart of a frequency divider, a chart (e) is a timing chart of a count value of a counter 52r, and a chart (f) is a timing chart of an output of an absolute-value circuit 52t.

The following description will be focused mainly on the operation of the gap-condition recognition unit 52 that is different from that of the third embodiment. The gap-condition recognition unit 52, however, is still the same as that in the third embodiment in that it divides the evaluation period in two regions, performs incremental counting in one region and performs decremental counting in the other region. This causes the reference value to be zero, therefore allowing a subtracter to be eliminated as in the case of the third embodiment.

The fourth embodiment differs from the third embodiment in that the division of the evaluation period into two sub-periods or regions is achieved by using a frequency-division result of the discharge-occurrence pulse signal rather than the result of the frequency-division of the clock pulses output from a timer.

In the fourth embodiment, the gap-condition recognition unit 52 is configured to have a frequency divider 52p, a clock 52n, a timer 52q, a counter 52r, and an absolute-value circuit 52t. The frequency divider 52p produces an output which is inverted each time the discharge-occurrence pulse signal is inputted. The clock 52n feeds pulses that are used as references for time measurement. The timer 52q determines the evaluation period. The counter 52r changes the counting direction, performs incremental counting for outputs of the clock 52n while the timer 52q is outputting preselected one of the output values. The counter 52r also performs decremental counting for outputs of the clock 52n while the frequency divider 52p is outputting the other output value. The counter 52r outputs the count value each time the evaluation period is over, and is then reset. The absolute-value circuit 52t outputs an absolute value of the counting result. The gap-condition recognition unit 52 is thus configured and operates as described below.

The clock 52n constantly generates clock signals, which are used as references for time measurement, as shown in the chart (a) in FIG. 10. The timer 52q generates pulses, as shown in the chart (b) in FIG. 10, for each evaluation period. The evaluation period is determined by the frequency of the clock 52n and the set value of the timer 52q, and may require adjustment depending on the machining conditions to be applied. Preferably, the frequency of the clock 52n is in a range of 100 kHz to 10 MHz, and the set value of the timer 52q is in a range of 10 msec to 0.1 msec.

The frequency divider 52p divides the frequency of the discharge-occurrence pulse signal, as shown in the chart (c) in FIG. 10, into two and outputs a signal as shown in the chart (d) in FIG. 10.

The counter 52r performs incremental counting for output pulses of the clock 52n when the output of the frequency divider 52p represents preselected one (for example, "high" values) of the two values and performs decremental counting for output pulses of the clock 52n when the output of the frequency divider 52p represents the other output value (for example, "low" values). Upon receipt of input from the timer 52q, the counter 52r outputs the count value and is reset. The chart (e) in FIG. 10 shows a count value of the counter 52r. It is recalled that, in the second embodiment, the reference value is subtracted from the count values. In the fourth embodiment, however, since the reference value is zero, the subtraction is not performed, as will be understood from the following description.

The counter 52r in the fourth embodiment performs decremental counting when the output of the frequency divider 52p represents the "low" value, whereas it performs incremental counting when the output of the gap-condition recognition unit 52 represents the "high value". In other words, when outputs of the frequency divider represent "low" and "high" values, the counter 52r integrates function outputs of the function generator which are represented by "1" and "−1", respectively. In this case, since the appearance probability of each output of the function generator is ½, the expected value of the output 000000 of the function generator represents zero, and the reference value also represents zero. For these reasons, a subtracter is not required.

The dotted line in the chart (e) of FIG. 10 represents a reference value of zero. Finally, the count value is converted by the absolute-value circuit 52t to an absolute value, and the absolute value is outputted as a wire-breakage probability index. The chart (f) in FIG. 10 represents an output value of the absolute-value circuit 52t.

In the described arrangement, with no variation in the discharge intervals, periods of time which are required for incremental counting and decremental counting are the same, therefore setting the reference value to zero. Accordingly, the same results as in the case of the third embodiment can be obtained without using a second frequency divider.

The fourth embodiment produces the same advantages as those offered by the second embodiment.

Namely, the described advantage can be obtained even when the evaluation period is divided into a plurality of sub-periods. Also, the same advantages can be obtained even with an arrangement in which different indices monotonicly increasing or decreasing in response to an increase in the absolute value are outputted. Furthermore, even more stable and suitable operation can be implemented by the use of a mean value or a shifting mean value over a plurality of index values.

In the described fourth embodiment, the reference value always represents zero whenever even numbers of discharge pulses have been generated. This allows an arrangement to be such that the evaluation period is completed upon generation of a predetermined even number of pulses.

Also, in the described fourth embodiment, the frequency divider 52p for outputting one of two types of the values on a probability of ½ for controlling the counter. However, as in the case of the second embodiment, any function generator may be used as long as the appearance probability is known in advance for each of the output values.

Also, in the described fourth embodiment, output values of the function generator are one of "−1" and "1". Therefore, integration can be executed by addition (that is, incremental counting) for outputs of the value "1" and by subtraction (that is, decremental counting) for outputs of the value "−1". Generally, however, multiplication must be performed for integration of output values. This is also the same as in the case of the second embodiment.

(Advantages of the Present Invention)

As will be understood from the foregoing description, the present invention offers the following advantages.

The wire-discharge machining apparatus in accordance with one aspect of the present invention comprises: evaluating means for measuring one of the cycle time, the frequency, and the ignition delay time of the discharges, for evaluating dispersion of the measured values, and for outputting an evaluation value for the dispersion; and control means for controlling machining conditions based on the evaluation value for the dispersion.

Thus, the wire-discharge machining apparatus of the present invention evaluates the probability of occurrence of wire breakage based on the dispersion of the time intervals at which discharges occur. It is therefore possible to detect, without excess and insufficiency, any portion of the electrode path at which wire-breakage is more likely occur than at other portions, such as a step, end surface or the like, besides corners of the electrode path. It is also to be noted that the detection be performed without being disturbed by any control which is executed to avoid wire-breakage. Consequently, the control for avoiding wire-breakage can be performed sufficiently to a required extent, thus allowing a remarkable improvement in the machining performance.

The evaluating means may be arranged to evaluate at least one of the sample variance of the measured values, unbiased variance of the measured values, the standard deviation of the measured values, the variation coefficient of the measured values, the squared mean of the measured values, the distortion of the measured values, the kurtosis of the measured values, the mean deviation of the measured values, and the absolute values of the differences between the measured values and the mean value.

The evaluating means may further comprise: means for determining the square of the mean of the measured values; means for determining the mean of the squares of the measured values; and means for determining the difference between the square of the mean of the measured values and the mean of the squares of the measured values.

With these features, the wire-discharge machining apparatus of the present invention can evaluate the dispersion of the measured values in a more rational way, thus enhancing the reliability of the wire-breakage prevention control.

The evaluating means also may be arranged to further comprise: a function generator for producing outputs variable over two or more kinds in accordance with occurrence of a discharge; an integrator for integrating the outputs of the function generator; and means for outputting either the absolute value of the difference between the output of the integrator and the product of the integration period and the expected value of the output of the function generator, or an index which is in a monotonic relation to the absolute value.

The evaluating means may also be configured to further comprise: a function generator for producing outputs variable over two or more kinds in accordance with occurrence of a discharge; an integrator for integrating the differences between the outputs of the function generator and the expected values of the outputs of the function generator; and means for outputting either the absolute value of the output of the integrator or an index which is in a monotonic relation to the absolute value.

The evaluating means also may be arranged to comprise: a function generator for producing outputs variable over two or more kinds in accordance with occurrence of a discharge; an integrator for integrating the outputs of the function generator; means for dividing the period of integration into two regions of an equal length; and means for outputting the absolute value of the output of the integrator or an index having a monotonic relation to the absolute value; wherein the integrator performs the integration in opposite directions in the two regions of integration.

The arrangement also may be such that the evaluating means comprises: a function generator for producing outputs which are variable over two or more kinds in accordance with occurrence of a discharge and the expected values of which are zero; an integrator for integrating the outputs of the function generator; and means for outputting the absolute value of the output of the integrator or an index having a monotonic relation to the absolute value.

These features make it possible to evaluate the discharge intervals by a simple arrangement, thus facilitating prevention of the wire-breakage.

Preferably, the function generator comprises a frequency divider for producing an output inverted each time the discharge occurs.

It is also preferred that the integrator is a counter.

The wire-discharge machining apparatus of the present invention may further comprise: a timer for measuring time intervals whereat the discharges occur; a first FIFO matrix for storing resultant values of measurement by the timer; a first register for storing the sum of the resultant values stored in the first FIFO matrix; a first adder for adding the resultant values of measurement by the timer to the value stored in the first register; a first subtracter for subtracting values of outputs of the first FIFO matrix from the value stored in the first register; a first squaring calculator for squaring contents of the first register; a second squaring calculator for squaring the resultant values of measurement by the timer; a second FIFO matrix for storing values of outputs of the second squaring calculator; a second register for storing the sum of the values stored in the second FIFO matrix; a second adder for adding values of outputs of the second squaring calculator to the value stored in the second register; a second subtracter for subtracting values of outputs of the second FIFO matrix from the value memorized in the second register; and a third subtracter for subtracting values of outputs of the second squaring calculator from contents of the second register; wherein the evaluating means uses an output of the third subtracter as the evaluation value for he dispersion.

The wire-discharge machining apparatus may further comprise: a clock for generating clock pulses to be used as references for time measurement; a timer for outputting evaluation pulses at constant time intervals; a frequency divider for producing an output logically-inverted each time the discharge occurs; a counter which counts the clock pulses only when the output of the frequency divider represents preselected one of the two values, produces an output and concurrently, resets the count value each time the evaluation pulse is outputted; a subtracter for subtracting a constant reference value from the output of the counter; and an absolute-value circuit for outputting an absolute value of a resultant value of subtraction by the subtracter; wherein the evaluating means uses the output of the absolute-value circuit as the evaluation value for the dispersion.

The wire-discharge machining apparatus may further comprise: a clock for generating clock pulses to be used as references for time measurement; a timer for outputting evaluation pulses at constant time intervals; a first frequency divider for producing an output logically-inverted each time the discharge occurs; a second frequency divider for producing an output logically-inverted each time the evaluation pulse is generated; a counter for performing a counting operation for the clock pulses only when the output of the first frequency divider represents preselected one of the two values, the counting operation being performed in the increasing direction only when the output of the second frequency divider represents preselected one of the two values, and in a decreasing direction when the output of the second frequency divider represents the other of the two values, and for outputting a count value and resetting the count value after performing the respective counting operations in the increasing direction and in the decreasing direction ver an equal period of time; and an absolute-value circuit for outputting an absolute value of the output of the counter; wherein the evaluating means uses the output of the absolute-value circuit as the evaluation value for the dispersion.

The wire-discharge machining apparatus may further comprise: a clock for generating clock pulses to be used as references for time measurement; a timer for outputting evaluation pulses at constant time intervals; a frequency divider for producing an output logically-inverted each time the discharge occurs; a counter for performing a counting operation for the clock pulses in an increasing direction only when the output of the frequency divider represents preselected one of the two values, and in a decreasing direction being performed when the output of the frequency divider represents the other of the two values, and for outputting a count value and resetting the count value each time the evaluation pulse is generated; and an absolute-value circuit for outputting an absolute value of the output of the counter; wherein the evaluating means uses the output of the absolute-value circuit as the evaluation value for the dispersion.

With these features, it is possible to implement stable and appropriate operation, and to evaluate the dispersion of the discharge intervals with a simple arrangement, while enabling sufficiently effective wire-breakage prevention control to the necessary extent.

The arrangement may be such that the evaluating means uses, as the evaluation value for the variation one of the mean value, the shifting mean value, and the sum of evaluation values for multiple dispersions.

This arrangement permits a further rationalized evaluation of dispersion of the discharge intervals, thus enabling sufficiently effective wire-breakage prevention control to the necessary extent.

The arrangement may be such that the control means performs the control so as to suppress machining energy when the evaluation value for the dispersion exceeds a predetermined reference value.

The control means also may be arranged to set a greater suppression for the machining energy in accordance with an increase in the difference between the evaluation value and the reference value for the variation.

These features ensure that the wire-breakage prevention control can be effected without fail.

The control means may comprise at least one of: means for setting a long value of off-time; means for reducing orbital velocity of the wire electrode; means for setting a high electrode-position-controlling servo voltage; means for setting decreased duration of the discharge; and means for increasing impedance in a discharging circuit.

The control means with this feature enables the suppression of the machining energy in a variety of methods, thus enhancing the adaptability of the wire-discharge machining apparatus.

The present invention has been described with reference to what are presently considered to be the preferred embodiments and modifications. However, it is to be understood that the invention is not limited to the described embodiments and modifications. On the contrary, the invention is intended to cover various other modifications and equivalent arrangements included within the spirit and scope of the appended claims. The scope of the following claims is to be accorded the broadest interpretation so as to encompass all such modifications and equivalent structures and functions.

What is claimed is:

1. A wire-discharge machining apparatus for machining a workpiece by generating pulse discharges between a wire electrode and the workpiece, comprising:
    evaluating means for making multiple measurements of one of cycle time, frequency, and ignition delay time of the discharges as measured values, for evaluating dispersion of the measured values, and for outputting an evaluation value for the dispersion, wherein said evaluating means comprises:
        means for determining a square of a mean of the measured values;
        means for determining a mean of squares of the measured values; and
        means for determining a difference between the square of the mean of the measured values and the mean of the squares of the measured values; and
    means for controlling machining conditions based on the evaluation value.

2. A wire-discharge machining apparatus for machining a workpiece by generating pulse discharges between a wire electrode and the workpiece, comprising:
    evaluating means for making multiple measurements of one of cycle time, frequency, and ignition delay time of the discharges as measured values, for evaluating dispersion of the measured values, and for outputting an evaluation value for the dispersion, wherein said evaluating means comprises:
        a function generator for producing outputs variable over at least two parameters in accordance with occurrence of a discharge;
        an integrator for integrating the outputs of said function generator to produce an integral; and
        means for outputting either absolute value of a difference between the integral output by said integrator and a product of an integration period and expected values of the outputs of said function generator, or an index in monotonic relation to the absolute value; and
    means for controlling machining conditions based on the evaluation value.

3. The wire-discharge machining apparatus as claimed in claim 2, wherein said function generator comprises a frequency divider for producing an output inverted each time the discharge occurs.

4. The wire-discharge machining apparatus as claimed in claim 2, wherein said integrator is a counter.

5. The wire-discharge machining apparatus as claimed in claim 2, wherein said evaluating means uses, as the evaluation value, one of a mean value, a shifting mean value, and a sum of the evaluation values for multiple dispersions.

6. A wire-discharge machining apparatus for machining a workpiece by generating pulse discharges between a wire electrode and the workpiece, comprising:
    evaluating means for making multiple measurements of one of cycle time, frequency, and ignition delay time of the discharges as measured values, for evaluating dispersion of the measured values, and for outputting an evaluation value for the dispersion, wherein said evaluating means comprises:
        a function generator for producing outputs variable over at least two parameters in accordance with occurrence of a discharge;
        an integrator for integrating differences between the outputs of said function generator and expected values of the outputs of said function generator to produce an integral; and
        means for outputting either absolute value of the integral output by said integrator or an index in monotonic relation to the absolute value; and
    means for controlling machining conditions based on the evaluation value.

7. A wire-discharge machining apparatus for machining a workpiece by generating pulse discharges between a wire electrode and the workpiece, comprising:
    evaluating means for making multiple measurements of one of cycle time, frequency, and ignition delay time of the discharges as measured values, for evaluating dispersion of the measured values, and for outputting an evaluation value for the dispersion, wherein said evaluating means comprises:
        a function generator for producing outputs variable over at least two parameters in accordance with occurrence of a discharge;
        an integrator for integrating the outputs of said function generator;
        means for dividing a period of integration into two regions of equal duration, and
        means for outputting absolute value of the integral output by said integrator or an index having a monotonic relation to the absolute value, wherein said integrator integrates in opposite directions in the two regions; and
    means for controlling machining conditions based on the evaluation value.

8. A wire-discharge machining apparatus for machining a workpiece by generating pulse discharges between a wire electrode and the workpiece, comprising:
    evaluating means for making multiple measurements of one of cycle time, frequency, and ignition delay time of the discharges as measured values, for evaluating dispersion of the measured values, and for outputting an evaluation value for the dispersion, wherein said evaluating means comprises:
        a function generator for producing outputs which are variable over at least two parameters in accordance with occurrence of a discharge and expected values of which are zero;
        an integrator for integrating the outputs of said function generator to produce an integral; and
        means for outputting absolute value of the integral output by said integrator or an index having a monotonic relation to the absolute value; and
    means for controlling machining conditions based on the evaluation value.

9. A wire-discharge machining apparatus for machining a workpiece by generating pulse discharges between a wire electrode and the workpiece, comprising:
    evaluating means for making multiple measurements of one of cycle time, frequency, and ignition delay time of the discharges as measured values, for evaluating dispersion;

means for controlling machining conditions-based on the evaluation value;

a timer for measuring time intervals of the discharges;

a first first-in first-out (FIFO) memory for storing the time intervals measured by said timer as resultant values;

a first register for storing a sum of the resultant values stored in said first FIFO memory;

a first adder for adding the resultant values to the sum stored in said first register;

a first subtracter for subtracting the resultant values stored in said first FIFO memory from the sum stored in said first register;

a first squaring calculator for squaring the sum stored in said first register;

a second squaring calculator for squaring the resultant values to produce squared resultant values;

a second FIFO memory for storing the squared resultant values output by said second squaring calculator;

a second register for storing the sum of the squared resultant values stored in said second FIFO memory;

a second adder for adding the squared resultant values to the sum stored in said second register;

a second subtracter for subtracting the squared resultant values stored in said second FIFO memory from the sum stored in said second register; and a third subtracter for subtracting the squared resultant values from the sum stored in said second register to produce a difference, wherein said evaluating means uses the difference as the evaluation value for the dispersion.

10. A wire-discharge machining apparatus for machining a workpiece by generating pulse discharges between a wire electrode and the workpiece, comprising:

evaluating means for making multiple measurements of one of cycle time, frequency, and ignition delay time of the discharges as measured values, for evaluating dispersion;

means for controlling machining conditions based on the evaluation value;

a clock for generating clock pulses for time measurement;

a timer for outputting evaluation pulses at a constant interval;

a frequency divider for producing an output logically-inverted each time one of the discharges occurs;

a counter which counts the clock pulses only when an output of said frequency divider represents one of two values output by said frequency divider, produces an output, and, concurrently, resets a count value each time an evaluation pulse is output;

a subtracter for subtracting a constant reference value from the count value to produce a difference; and an absolute-value circuit for outputting an absolute value of the difference, wherein said evaluating means uses the absolute value as the evaluation value for the dispersion.

11. A wire-discharge machining apparatus for machining a workpiece by generating pulse discharges between a wire electrode and the workpiece, comprising:

evaluating means for making multiple measurements of one of cycle time, frequency, and ignition delay time of the discharges as measured values, for evaluating dispersion;

means for controlling machining conditions based on the evaluation value;

a clock for generating clock pulses for time measurement;

a timer for outputting evaluation pulses at a constant interval;

a first frequency divider for producing an output logically-inverted each time one of the discharges occurs;

a second frequency divider for producing an output logically-inverted each time one of the evaluation pulses is generated;

a counter for counting the clock pulses only when an output of said frequency divider represents a first value of the two values output by said first frequency divider, the counting being performed in an increasing direction only when an output of said second frequency divider represents a first value of the two values output by said second frequency divider, and in a decreasing direction when the output of said second frequency divider represents a second of the two values output by said second frequency divider, and for outputting a count value and resetting the count value after counting in the increasing direction and in the decreasing direction during an equal period of time; and an absolute-value circuit for outputting an absolute value of the count value, wherein said evaluating means uses the absolute value as the evaluation value for the dispersion.

12. A wire-discharge machining apparatus for machining a workpiece by generating pulse discharges between a wire electrode and the workpiece, comprising:

evaluating means for making multiple measurements of one of cycle time, frequency, and ignition delay time of the discharges as measured values, for evaluating dispersion;

means for controlling machining conditions based on the evaluation value;

a clock for generating clock pulses for time measurement;

a timer for outputting evaluation pulses at a constant interval;

a frequency divider for producing an output logically-inverted each time one of the discharges occurs;

a counter counting the clock pulses in an increasing direction only when an output of said frequency divider represents a first value of the two values output by said frequency divider, and in a decreasing direction when the output of said frequency divider represents a second of the two values, and for outputting a count value and resetting the each time an evaluation pulse is generated; and an absolute-value circuit for outputting an absolute value of the count value, wherein said evaluating means uses the absolute value as the evaluation value for the dispersion.

13. A wire-discharge machining apparatus for machining a workpiece by generating pulse discharges between a wire electrode and the workpiece, comprising:

evaluating means for making multiple measurements of one of cycle time, frequency, and ignition delay time of the discharges as measured values, for evaluating dispersion;

means for controlling machining conditions based on the evaluation value and suppressing machining energy when the evaluation value for the dispersion exceeds a reference value.

14. The wire-discharge machining apparatus as claimed in claim 13, wherein said means for controlling machining conditions increases suppression of the machining energy in response to an increase in a difference between the evaluation value and the reference value.

15. The wire-discharge machining apparatus as claimed in claim 13, wherein said means for controlling machining conditions comprises at least one of:

means for setting a value of off-time;

means for reducing orbital velocity of the wire electrode;

means for setting a high electrode-position-controlling servo voltage;

means for setting decreased duration of the discharges; and means for increasing impedance in a discharging circuit.

* * * * *